Raymond I. Strickland
William C. McCorkle, Jr.,
INVENTORS.

BY S. J. Rotondi,
A. T. Dupont,
and
Alvin E. Moore

Jan. 24, 1961    R. I. STRICKLAND ET AL    2,968,996
FIN-STABILIZED, CENTER-ROTATED ROCKET
Filed July 13, 1959    4 Sheets-Sheet 3
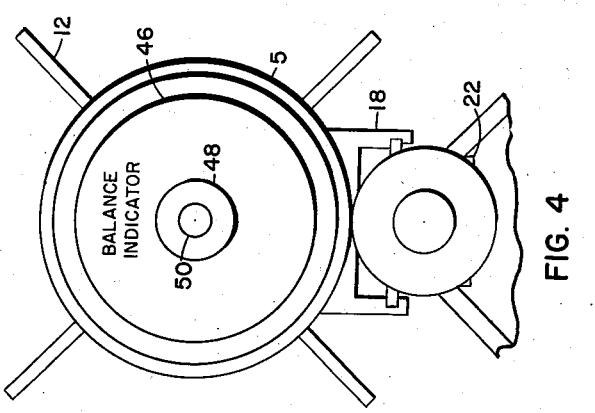
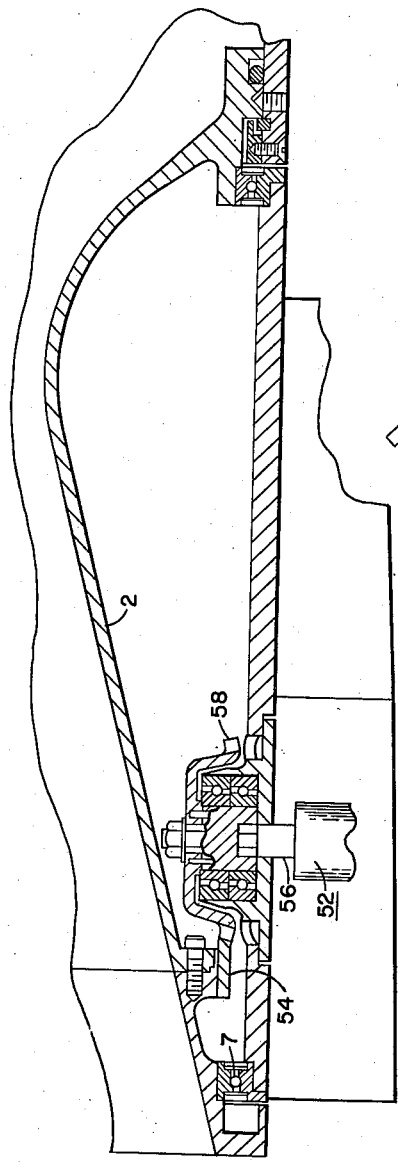
Raymond I. Strickland
William C. McCorkle, Jr.,
INVENTORS.
S. J. Rotondi,
BY A. T. Dupont,
and
Alvin E. Moore Jan. 24, 1961

R. I. STRICKLAND ET AL 2,968,996

FIN-STABILIZED, CENTER-ROTATED ROCKET

Filed July 13, 1959

Raymond I. Strickland
William C. McCorkle, Jr.,
INVENTORS.

BY S. J. Rotondi,
A. T. Dupont,
and
Alvin E. Moore.

United States Patent Office 2,968,996
Patented Jan. 24, 1961

2,968,996
FIN-STABILIZED, CENTER-ROTATED ROCKET

Raymond I. Strickland and William C. McCorkle, Jr., Huntsville, Ala., assignors to the United States of America as represented by the Secretary of the Army Filed July 13, 1959, Ser. No. 826,886

5 Claims. (Cl. 89—1.7)

(Granted under Title 35, U.S. Code (1952), sec. 266)

The invention described herein may be manufactured and used by or for the Government for governmental purposes without the payment of any royalty thereon.

This invention relates to a fin-stabilized, center-rotated rocket. A rocket that is stabilized by fins has certain advantages over one that is gyroscopically stabilized. The known fin-controlled rocket has an arrow-like stabilization that is somewhat effective to hold the rocket aligned with its desired trajectory in the atmosphere, and does not have the defects of the finless, gyroscopically stabilized rocket. One of these defects is the tendency of the gyroscopic effect, which is the result of a high rate of spin, to hold the rocket in a fixed attitude in space, so that it fails to "trail"—that is, fails to orient its axis in the desired trajectory. This failure to trail increases the rocket's drag and dispersion and lessens its accuracy. Another defect of the spin-stabilized rocket is a result of the Magnus effect, which involves a disturbing, hard-to-predict moment placed on the rotating rocket by any cross wind during flight.

On the other hand, the known types of fin-stabilized rockets have a thrust-malalignment defect that is inherent in the difficulty of exactly placing and maintaining the center of gravity of the rocket on the line of its thrust. Inaccuracies in this placing may be caused, for example, by: unsymmetrical mass distributions in manufacture or assembly, as in uncentered propellant grain, or warhead or other payload misalignment relative to the thrust axis; misalignment of the nozzle and thrust axes due to imperfect gas flow, a result of uneven burning of the propellant; or distortion of the rocket motor in operation, due to heat and pressure.

In view of the above facts, an object of this invention is to provide a fin-stabilized rocket which has an inherent, automatic means of compensating for the accuracy-disturbing effects of displacement of its center of mass from its line of thrust.

Another object of the invention is to provide a stabilized rocket, whose axis is arrow-stabilized by fins, so that the rocket "trails" (that is, remains tangential to its trajectory) during flight, but whose interior mass is rotated in flight, at a speed that has little gyroscopic effect, thus compensating for inaccuracies in the location of the center of mass.

Another object is to provide a rocket launcher and rocket assembly having straight launcher rails and means for rotating the central mass of a rocket, while holding the rocket shroud in position for straight-line launching, thus compensating for inaccuracies in the location of the center of mass and for aerodynamic imbalance.

The foregoing and other objects of the invention will become more fully apparent from the following detailed description of exemplary structure embodying the invention and from the accompanying drawings, in which:

Figure 4 is an end elevation of the rocket and launcher assembly, with a balance indicator in place on the rocket.

Figure 5 is an elevational, sectional view, partly broken away, of another form of the rocket and launcher assembly.

Figure 1:
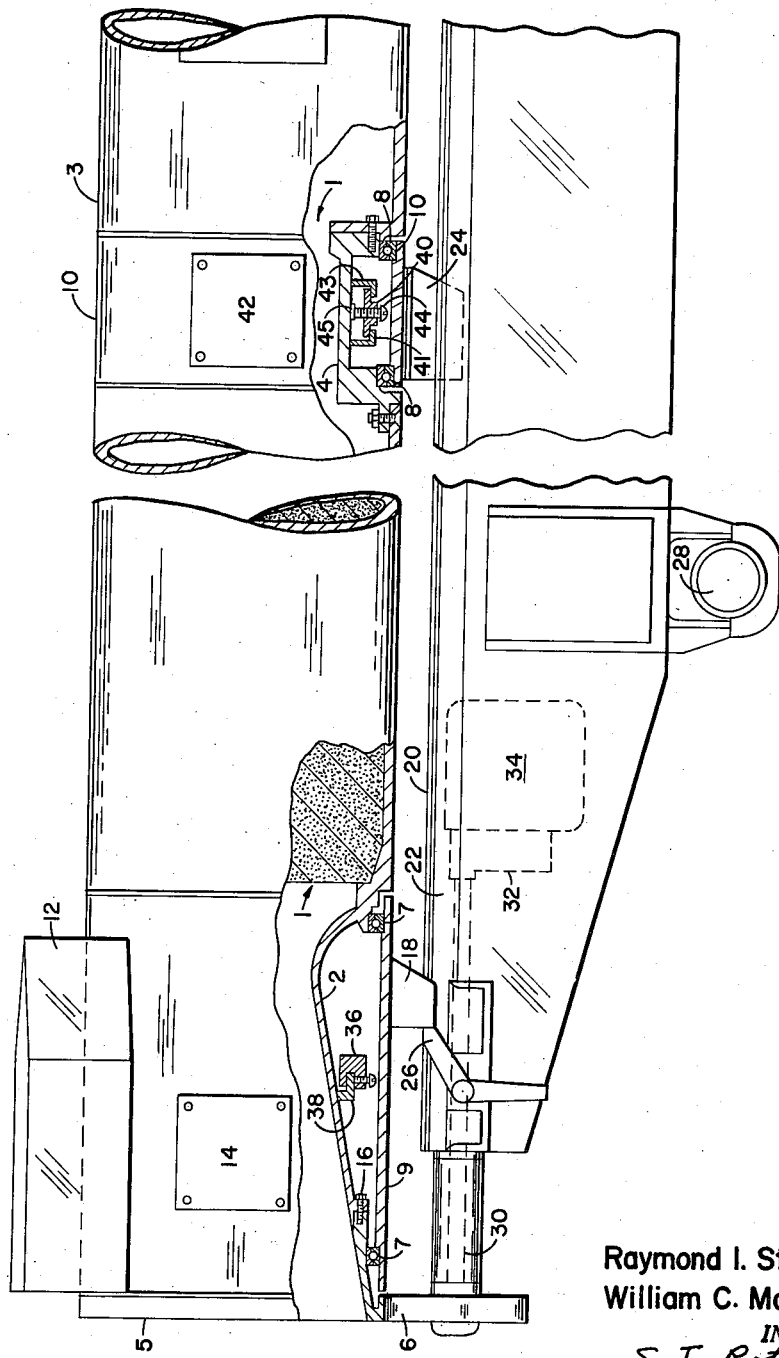
Figure 1 is an elevational view, partly in section and partly broken away, of the rocket and launcher assembly, showing the rocket in position on its straight-rail launcher, and means for rotating and stabilizing the central mass of the rocket while holding a portion of its outer shell against rotation.
Figure 2:
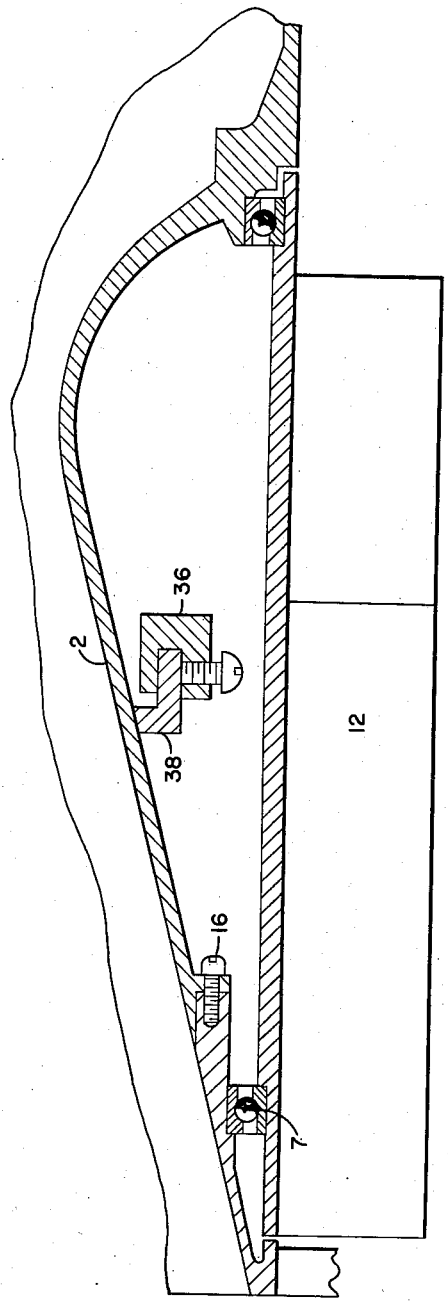
Figure 2 is a detail, sectional view of an after portion of the rocket in flight, showing the manner in which each of the arrow-stabilizing fins is mounted relative to the rocket's rotating central mass.
Figure 3:
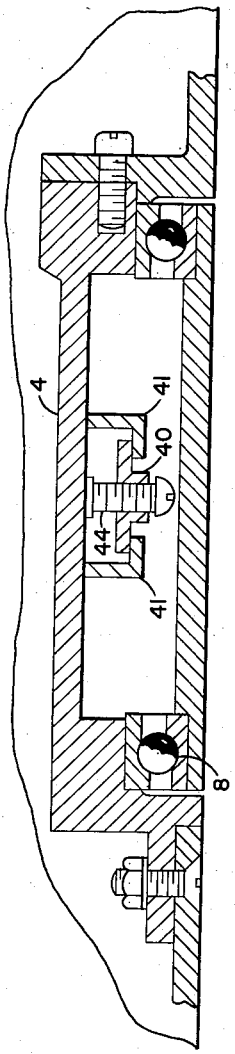
Figure 3 is a detail, sectional view of a forward portion of the rocket, showing the mounting of the forward supporting ring relative to the rotating central mass.

In Figure 1, the rocket of this invention is shown as having a centrally located rotatable part 1, comprising a nozzle 2, a forward rotatable portion 3, a middle, recessed rotatable portion 4, and an after friction ring 5, which rotates the central part when it is turned by friction wheel 6.

Rotatable part 1 is journalled by bearings 7 and 8 in after support ring 9 and forward support ring 10. To ring 9, four fins 12 are affixed (only one of these fins being shown in Figure 1). These fins may be slightly canted so as to produce a slow, non-gyroscopic rotation of the rocket in flight. Ring 9 also has a plate 14 that is fastened over access ports (thru which screws 16 and balance weights 36 may be inserted). Ring 9 is secured to shoe 18, which has a forked base that straddles the flanges 20 that are on opposite sides of conventional straight launcher rail 22. Support ring 10 also is secured to shoe 24, which is slidably held in the central groove of the rail. Stop 26 prevents rearward movement of the rocket when it is on the launcher and tilted by means of trunnions 28.

For friction gearing 5—6, a toothed-gear, or sprocket-chain or belt drive may be substituted. Friction wheel 6, or its equivalent, may be rotated by shaft 30, which is turned, thru gearing in box 32, by motor 34. This motor may be driven by compressed air or by a spring, but preferably is electric.

The invention comprises optionally usable means for statically and dynamically balancing the assembled rocket. Since the warhead or other payload is usually selected and assembled with the other components just before the rocket is launched, such balancing should be done at the launching site. This is possible with out invention because the major part of the rocket is journalled in bearings which have an axis that coincides with the symmetry axis of the rocket and its nozzle. Static and dynamic balance is achieved by means of after movable weights 36, adjustably clamped to ring 38 which is fixed to and surrounds nozzle 2, and forward weights 40, adjustably clamped to rings 41 which are fixed to and surround rotatable cylinder 4. Weights 40 are inserted thru access door 42, and thru slots in clamping rings 43. They are moved to their rocket balancing position while they are loose on clamping screws 44; and then each clamping screw is turned on its rotatably mounted head 45 until it is outwardly clamped against holding rings 43.

Some rockets may be designed so that they are sufficiently balanced to be efficiently fired without the use of the balancing weights and clamping means. In rockets where such weights are desirable, however, they may be used to balance the rocket either statically or dynamically. In either instance, a balance indicating means of known design may be used as part of our launcher and rocket assembly.

Figure 4 shows a static balance indicator clamped or frictionally held in place in the expansion cone of the rocket motor. This indicating mechanism, which is of a known type, comprises a disk 46 which is commonly used by being placed in the dished portion of an automobile wheel. It also comprises an indicator casing 48, which houses two pointers, viewable thru a glass window in said casing, from above the casing as it is shown in Figure 4. One of these pointers indicates the quadrant in which imbalance occurs when the rocket is turned by motor 34; the other indicates the number of ounces needed in that position to correct the imbalance. Each pointer is actuated by one or more weighted disks 50, which disks are parallel to each other (only one of these disks being visible in Figure 4). Any of various other known types of static and/or dynamic balance indicating mechanisms may be used with our motor 34, launcher rail and rocket, before balancing the rocket.

Figure 6:
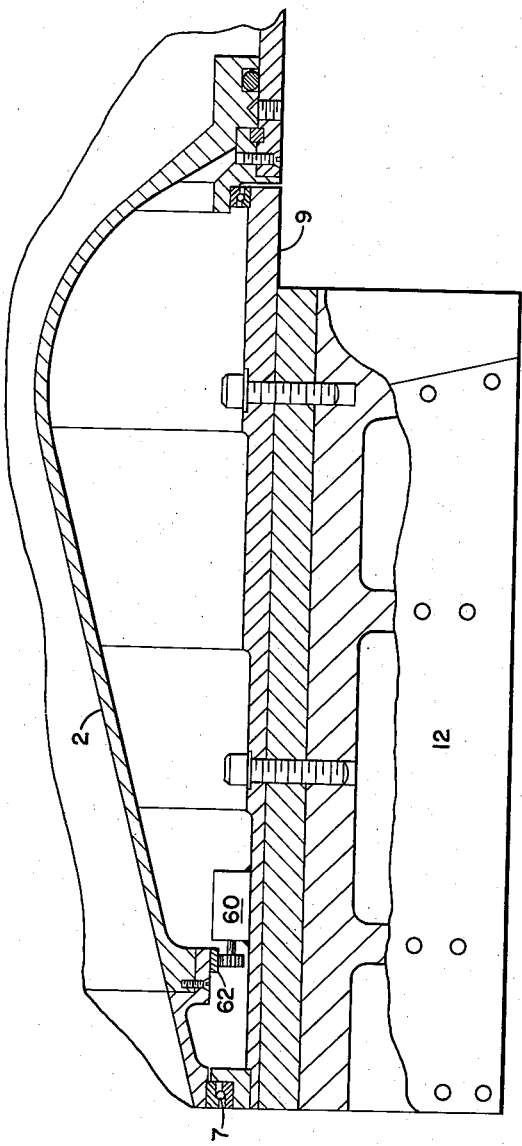
Figure 6 is a sectional, detail view of a third form of the rocket and launcher assembly.
Figure 7:
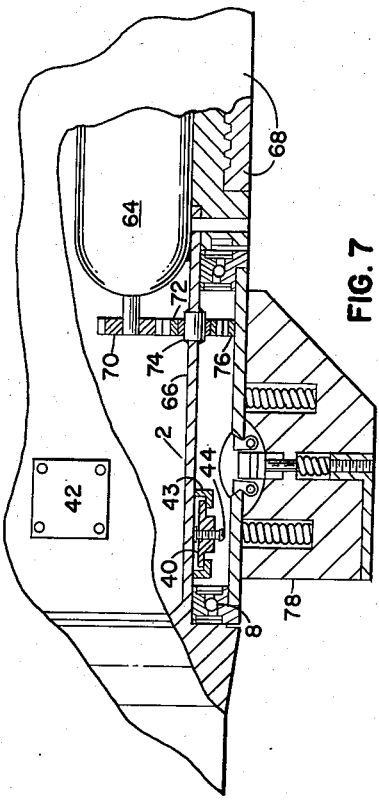
Figure 7 is a sectional, detail view of a fourth form of the rocket and launcher assembly.

In Figures 5, 6 and 7 there are shown three other forms of mechanism by means of which the rocket may be spun on the launcher. In Figure 5, motor 52 drives ring gear 54 by means of polygonal shaft end 56, which drivingly fits a socket in the hub of gear 58. After the rocket reaches the desired speed of rotation motor 52 is pulled downwardly from engagement with the socket. In Figure 6, motor 60, which may be electrical or fluid operated, drives ring gear 62 that surrounds the expansion cone. This motor is relatively small and inexpensive, and goes with the rocket in its flight. In Figure 7, a similar motor, 64, is fixed to the forward part of the rotatable central portion of the rocket. In this embodiment the motor casing is welded or otherwise secured to rotatable cylinder 66; and one end of it juts into the space within the warhead or other payload, 68. Motor 64 drives spur gear 70, which rotates gear 72 on shaft 74. Shaft 74 is fixed to cylinder 66; and gear 72 is located in a slot in said cylinder, and is in mesh with ring gear 76. Since ring gear 76 is held against rotation by rocket guide shoe 78, gear 70 planetates within the ring gear, and rotates the central, major portion of the rocket. For either of motors 60 and 64 any known type of servo motor may be substituted. For example, a known type of small jet or rocket motor with nozzles that discharge gas tangentially to the outer surface of the rocket thru the ring or flange 5 may be utilized for the desired rotation.

*Operation*

If the rocket is of the type that requires balancing at the launcher site it is balanced by utilizing a known type of balance indicating mechanism, rotating the rocket by motor 34 (or 52, 60 or 64), and adjusting weights 36 and 40.

Then, just before the rocket is fired, part 1, comprising most of the mass of the rocket, is again rotated by motor 34 at a speed sufficiently low to obviate any gyroscopic action that would override the trailing effect of the fins. This low speed, which is a matter of engineering calculations, usually must be less than 100 revolutions per second, and preferably is in the range of three to 25 r.p.s.

After the desired speed is obtained, and while its central major mass is still rotating, the rocket is fired. In the initial part of its flight any residual misalignment, or any developing misalignment of the thrust axis, is compensated for by the continual averaging of the effect of the misplaced thrust through 360 degrees, by means of the continued rotation of nearly all the mass of the rocket.

As the rocket increases its speed in flight the problem of aerodynamic malalignment becomes more important. Much of this aerodynamic misalignment is averaged out by the turning of part 1, most of which has an outer surface exposed to the ambient air. The remainder of the aerodynamic misalignment is effective on the exterior surfaces of rings 9 and 10 in Figure 1, or of the equivalent rings in the other forms of the invention. Although these rings are not rotated prior to launching, the slight canting of fins 12 and the friction of bearings 7 and 8 cause the rings to begin a slow rotation soon after the launching; and such rotation averages out the accuracy-disturbing effect of their misalignment. This rotation, however, is not fast enough appreciably to alter the rocket's position as a result of the Magnus effect of cross winds. Also the slow rotation of the rocket's mass, as a whole, does not exert sufficient gyroscopic force on that mass to interfere with the trailing effect of the fins.

We claim:

1. A fin-stabilized, center-rotated self-propelled missile comprising: an outer, shroud portion adapted to be held against rotation in a conventional straight-rail launcher; launching guide means fixed to said shroud portion and adapted to coact with the rail of a conventional straight-rail launcher; fins fixed to the perimeter of said portion, said fins being constructed and arranged to coact with the atmosphere during flight and to cause the longitudinal axis of said missile to maintain a position that is substantially tangential to its trajectory; a rotatable part, having a mass that is the major portion of the entire mass of the missile, said rotatable part comprising a missile motor, propellant, a payload, a power-transmission element constructed and arranged to be engaged and rotated by power means mounted on said rail when the missile is on said rail, and a connection between said power-transmission element and said missile motor, said element and connection being constructed and arranged, relative to said power means, to rotate said rotatable part at a non-gyroscopic speed; whereby when said power-transmission element is rotated, said rotatable part is spun at said non-gyroscopic speed just prior to launching of the missile, a ring encircling a forward portion of said rotatable part and journaled relative to said part; and launching guide means fixed to said ring, adapted to coact with the rail of a conventional straight-rail launcher.

2. In combination: a rocket launcher, comprising a straight rail, a servo motor and a gear element rotatable by said motor; and a rocket, comprising an outer part, guide means fixed to said part and coacting with said rail to force said rocket to travel in a straight line as it is launched along said rail, aerodynamic tail fins fixed to said part, the outer portions of said fins projecting outwardly beyond the major portion of the rocket's outer perimeter, said fins being constructed and arranged to coact with the atmosphere during flight and to cause the rocket to trail, with its longitudinal axis being maintained in a position that is substantially tangential to its trajectory, said rocket further having a rotatable part with a mass that is the major portion of the entire mass of the missile, said rotatable part comprising a centrally located rocket motor and propellant, and a power-transmission element in engagement with and quickly detachable from said gear element, and having a torque-transmitting connection with said rocket motor; a ring encircling a forward portion of said rotatable part and journaled relative to said part; and launching guide means fixed to said ring, adapted to coact with said rail; said servo motor, gear element and power-transmission element being constructed and arranged to rotate said inner part at a speed below that which would impart sufficient gyroscopic momentum to overcome the trailing and drag-reducing effect of said fins.

3. A rocket as set forth in claim 1, which further comprises weighted balancing elements, adjustably supported by said rotatable part.

4. A rocket comprising: an outer shroud portion having a mass that is a minor percentage of the total mass of the rocket; guide means fixed to said shroud portion, adapted to coact slidingly with the rail of a conventional straight-rail launcher; aerodynamic tail fins connected to said shroud portion and extending outwardly beyond the outer perimeter of said shroud portion for trailing the rocket in flight, maintaining its longitudinal axis substantially tangential to its trajectory; a rotatable portion having a mass that is a major percentage of the total mass of the rocket, comprising a power-transmission element adapted to be detachably engaged and rotated by power means mounted on said rail, and a connection between said power-transmission element and said rocket motor, said element and connection being constructed and arranged, relative to said power means, to rotate said rotatable part at a non-gyroscopic speed, whereby when said power-transmission element is rotated by said gearing element, said rotatable portion may be rotated just prior to launching of the rocket, a ring encircling a forward part of said rotatable portion and journaled relative to said portion; and launching guide means fixed to said ring, adapted to coact with the rail of a conventional straight-rail launcher.

5. In combination: a rocket launcher, comprising a straight rail, a servo motor and a gear element rotatable by said motor; a rocket outer shroud portion; means fixed to said portion for guiding said portion in the launching of said rocket along said straight rail; aerodynamic tail fins connected to said shroud portion and projecting outwardly a substantial distance beyond the major portion of the rocket's outer perimeter, for maintaining the longitudinal axis of the rocket in a flight position that is substantially tangential to the rocket's trajectory; a rotatable rocket portion, journalled relative to said shroud portion, and comprising a rocket motor, said rotatable portion being of substantially larger mass than said shroud portion; a power-transmission element connected to said rotatable portion, and detachably and rotatably engageable with said gear element, whereby said rotatable portion may be spun before it is launched; a ring encircling a forward part of said rotatable portion and journaled relative to said portion; and launching guide means fixed to said ring, adapted to coact with said rail; said servo motor, gear element and power-transmission element being constructed and arranged to rotate said rotatable portion at a speed lower than that which would provide an angular momentum capable of gyroscopically maintaining said longitudinal axis in a constant spatial attitude during flight.

References Cited in the file of this patent

UNITED STATES PATENTS

| | | |
|---|---|---|
| 2,520,433 | Robinson | Aug. 29, 1950 |
| 2,655,033 | Burrell | Oct. 13, 1953 |
| 2,680,974 | Hunter | June 15, 1954 |
| 2,730,927 | Bourquard | Jan. 17, 1956 |
| 2,900,873 | Wust | Aug. 25, 1959 |

FOREIGN PATENTS

| | | |
|---|---|---|
| 262,445 | Germany | July 14, 1913 |